UNITED STATES PATENT OFFICE.

FREDERICK W. HUBER AND FRANK FREELAND REATH, OF RIVERSIDE, CALIFORNIA.

PROCESS OF RECOVERING WATER-SOLUBLE POTASSIUM SALTS FROM FELDSPATHIC ROCKS OR THEIR DERIVATIVES IN THE MANUFACTURE OF PORTLAND CEMENT.

1,194,344.          Specification of Letters Patent.       Patented Aug. 8, 1916.

No Drawing.      Application filed January 26, 1916.  Serial No. 74,494.

*To all whom it may concern:*

Be it known that we, FREDERICK W. HUBER and FRANK FREELAND REATH, citizens of the United States, residing at Riverside, in the county of Riverside and State of California, have invented certain new and useful improvements in processes of recovering water-soluble potassium salts from feldspathic rocks or their derivatives in the manufacture of Portland cement, of which the following is a specification.

The present invention relates to the production and recovery of potassium salts in a soluble condition, in the manufacture of Portland cement, in a substantially quantitative manner, and in the form of any desirable potassium salts.

It has heretofore been proposed to obtain potash and Portland cement from feldspar, by adding limestone and an excess of calcium chlorid to finely ground feldspar and heating the mass to clinkering, whereby potassium chlorid would be driven out by the temperature used, and could be collected in any suitable way. It was suggested that this process might be carried out in a rotary kiln, see article by Herstein, in "*Journal of Engineering and Industrial Chemistry*," June, 1911, page 426. We are not aware that this process has ever come into commercial operation in the United States.

The process forming the subject matter of our present application comprises heating to a clinkering temperature, preferably in a rotary kiln, such as is ordinarily employed in the production of Portland cement, a mixture comprising feldspathic rock or its derivatives, with a sufficient amount of an insoluble halogen compound of the alkaline earth metals, to combine with and form all the potassium present, into a soluble halogen salt, and enough calcium carbonate to bring the composition of the whole up to that of a normal Portland cement raw mixture, this mixture being previously ground to a fineness sufficient to allow not less than 80% to pass a 200 mesh sieve. This intimate and finely ground mixture is fed into and burned in an ordinary rotary kiln, in precisely the same manner as any other Portland cement raw mixture, and during the heating operation the potassium contained in the raw material, for example feldspar, is unlocked and combines with the halogen present to form a soluble halogen salt of potassium, which is practically completely volatilized or sublimed at a temperature between 950 and 1000° C. and before the raw mixture starts to fuse or sinter. The flue gases, containing the products of combustion, gases such as carbon dioxid expelled from the limestone, or other form of calcium carbonate employed, excess air, etc., and containing the volatilized potassium salts are then washed, or treated in any other suitable manner, to cause the separation of the potassium salt. The potassium salt, in the form of an aqueous solution is thereafter treated with calcium carbonate or calcium sulfate, or other suitable alkali earth salts, and particularly barium carbonate and barium sulfate. We have found that strontium carbonate and sulfate do not operate well in this reaction. The reactions taking place may be expressed as follows:—

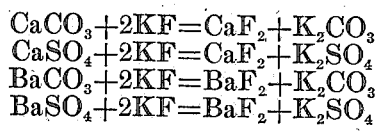

$$CaCO_3 + 2KF = CaF_2 + K_2CO_3$$
$$CaSO_4 + 2KF = CaF_2 + K_2SO_4$$
$$BaCO_3 + 2KF = BaF_2 + K_2CO_3$$
$$BaSO_4 + 2KF = BaF_2 + K_2SO_4$$

In carrying out these reactions it is preferable to employ a warm or hot solution of potassium fluorid, since the reaction between the potassium fluorid and alkali earth salts takes place much more rapidly when hot, than when cold.

On account of the cheapness and activity of the material, we prefer to use in the mixture, calcium fluorid, since with this material, a somewhat larger percentage of the potassium can be volatilized than with any of the other fluorids with which we have experimented, and also since the reaction between the potassium fluorid takes place more completely and more rapidly with calcium carbonate and calcium sulfate than with either the barium or strontium compounds.

As a specific example of our invention we may proceed as follows: To a finely ground feldspathic mineral containing a known and predetermined amount of $K_2O$ we add for every 1% $K_2O$ present not less than 0.83% $CaF_2$ by weight, to this mixture enough calcium carbonate is added to bring the composition to that of a normal Portland cement raw mixture, grinding the whole mass either wet or dry to a fineness of not less than 80% through a standard 200 mesh sieve, feeding this intimate and finely ground mixture into a rotary kiln and burning it to a cement clinker, condensing the potassium fluorid in the flue or waste gases and treating thereafter the potassium fluorid so obtained, in aqueous solution with either finely ground calcium carbonate or calcium sulfate to recover the fluorin as calcium fluorid and the potassium as carbonate or sulfate at a temperature under or at that of boiling at atmospheric pressure.

We are not limited to the precise proportions stated in the above example. 1 part of $K_2O$ requires for its complete conversion substantially .828 parts of calcium fluorid, for the completion of the reaction $K_2O + CaF_2 = 2KF + CaO$, but we may use from about seven tenths of this proportion of $CaF_2$ up to two and two tenths times as much calcium fluorid as would correspond to this proportion. We find that with seven tenths of one equivalent of $CaF_2$, at a temperature of 950 to 1000° C., which temperature is maintained for about half an hour, about 80% of the total potash contained in the feldspathic rock can be volatilized. Using chemically equivalent quantities, about 85% can be volatilized under these conditions. Using about one and five tenths equivalents of calcium fluorid, 90% of the total potash can be volatilized, and using two and two tenths equivalents of calcium fluorid, about 94% of the potash can be volatilized. For commercial reasons we prefer to employ approximately chemically equivalent proportions. The specific tests above referred to were carried out on a commercial scale, heating a mixture consisting of about 75% $CaCO_3$ and 25% of orthoclase containing 12.8% of potash, and the varying amounts given in the conversion of the calcium fluorid.

In the conversion of the potassium fluorid into calcium fluorid and soluble potassium salt, it is not necessary that chemically equivalent quantities should be employed. An excess of the calcium salt employed, such as carbonate or sulfate does no particular harm, and insures the completion of the conversion of potassium fluorid into calcium fluorid, and the mixture thereby produced, consisting of calcium fluorid with calcium sulfate or carbonate can then be employed in the production of a Portland cement raw mix.

The recovery of the calcium fluorid for reuse is a feature of very great importance economically, since while calcium fluorid, in the form of the mineral fluorspar, is cheap in some localities, it is rather expensive when it has to be shipped for considerable distances. The artificial calcium fluorid produced in this process appears to be much more reactive than natural fluorspar, perhaps on account of its extremely finely divided condition, being in a state of fineness impossible to produce, by mere grinding of fluorspar. The reaction between the potassium fluorid solution and the calcium salt takes place rapidly and substantially quantitatively, at a temperature of about 80° C.

Another feature of commercial importance resides in the fact that in this process there are no useless waste products, as everything is either regenerated or converted into a valuable product.

While we have referred particularly to the use of calcium carbonate as the calcareous material preferably employed, we do not wish to be restricted to this, since any of the calcareous materials heretofore suggested can be employed in our process.

What we claim is:—

1. A process of making Portland cement and soluble potassium salts, which comprises heating together an insoluble haloid salt of an alkali earth metal in a state of extreme subdivision, a potassium-containing silicate rock, and a calcareous material in proportions to form Portland cement, to a temperature not materially below 950° C. for a length of time sufficient to drive off at least the major portion of the potassium present in said rock.

2. In the manufacture of Portland cement, the step of heating together a precipitated alkali earth metal fluorid, a feldspathic rock, and a calcareous material all in comminuted form, and so proportioned as to produce a Portland cement raw mix, to a sufficiently high temperature and for a sufficient length of time, to drive off at least the major portion of the potash present.

3. The herein described cyclical process which comprises heating together an alkali earth metal fluorid, an insoluble potassium-containing silicate, and a calcareous material, existing in the form of an intimate mixture, in proportions to form a Portland cement raw mix, said heating being to a sufficiently high temperature and for a sufficient length of time to drive off at least the major portion of the potassium present in said silicate; collecting the potassium fluorid and reacting with a solution thereof upon an alkali earth metal compound to regenerate alkali earth metal fluorid for reuse in the process, and returning said alkali earth metal fluorid to the cycle of operations.

4. The herein described cyclical process which comprises heating together calcium fluorid, a feldspathic rock and a calcareous material, in the form of an intimate mixture in proportions to form a Portland cement raw mix, said heating being to a sufficiently high temperature and for a sufficient length of time to drive off at least the major portion of the potassium present in the silicate; collecting the potassium fluorid and reacting with a solution thereof, upon a calcium compound to regenerate calcium fluorid for reuse in the process and returning said calcium fluorid to the cycle of operations.

5. A process which comprises mixing together a solution of potassium fluorid and an alkali earth metal salt insoluble in water, to produce an insoluble alkali earth metal fluorid and a soluble potassium salt, and separating said two materials.

In testimony whereof we have affixed our signatures.

FREDERICK W. HUBER.
FRANK FREELAND REATH.